United States Patent [19]

Urban et al.

[11] 3,929,383
[45] Dec. 30, 1975

[54] SKID CONTROL SYSTEM INCLUDING A RELAY COMPENSATOR VALVE FOR RAPID BRAKE PRESSURE RE-APPLICATION FOLLOWED BY SLOWER RATE OF PRESSURE RE-APPLICATION

[75] Inventors: John A. Urban, Livonia; Gary Lee Hopkins, Farmington, both of Mich.

[73] Assignee: Eaton Corporation, Ohio

[22] Filed: Sept. 26, 1974

[21] Appl. No.: 509,527

Related U.S. Application Data

[63] Continuation-in-part of Ser. No. 458,608, April 8, 1974, which is a continuation of Ser. No. 293,868, Oct. 2, 1972, abandoned, which is a continuation-in-part of Ser. No. 271,824, July 14, 1972, abandoned, which is a continuation of Ser. No. 125,280, March 17, 1971, abandoned.

[52] U.S. Cl. .................... 303/21 F; 303/40; 303/68
[51] Int. Cl.² ........................ B60T 8/02; B60T 15/12
[58] Field of Search ............... 303/21 F, 40, 61–63, 303/68–69; 188/181 A

[56] References Cited
UNITED STATES PATENTS

| | | | |
|---|---|---|---|
| 2,417,211 | 3/1947 | Newell | 303/21 F |
| 2,440,343 | 4/1948 | McCune | 303/21 F |
| 3,006,696 | 10/1961 | Yarber | 303/21 F X |
| 3,515,440 | 6/1970 | Every et al. | 188/181 A X |
| 3,695,734 | 10/1972 | Hennig et al. | 303/21 F |
| 3,752,537 | 8/1973 | Ochiai | 303/21 F |

*Primary Examiner*—Trygve M. Blix
*Assistant Examiner*—Douglas C. Butler
*Attorney, Agent, or Firm*—Teagno & Toddy

[57] ABSTRACT

A skid control system is provided including a relay compensator valve for cycling brake pressure, with the brake pressure rise curve being characterized by a rapid first stage rise rate and a substantially slower second stage rise rate. The valve includes a flow passage interconnecting an outlet pressure chamber and a compensating pressure chamber, the flow passage including a flow restriction. A pressure modulating valve is disposed in the flow passage and is operable to fluidly bypass the flow restriction in response to a predetermined pressure differential between the outlet chamber and the compensating chamber. Thus, the compensator pressure is never more than the predetermined pressure differential below the brake pressure to ensure that brake pressure rises to very nearly ideal brake pressure before the start of restriction of the brake pressure buildup, after the first brake application.

9 Claims, 6 Drawing Figures

SKID CONTROL SYSTEM INCLUDING A RELAY COMPENSATOR VALVE FOR RAPID BRAKE PRESSURE RE-APPLICATION FOLLOWED BY SLOWER RATE OF PRESSURE RE-APPLICATION

CROSS-REFERENCE TO RELATED PATENT APPLICATION

This application is a continuation-in-part of Serial No. 458,608, filed Apr. 8, 1974 which is a continuation of Ser. No. 293,868, filed Oct. 2, 1972, now abandoned, which was a continuation-in-part of Ser. No. 271,824, filed July 14, 1972, now abandoned, which in turn was a continuation of application Ser. No. 125,280, filed Mar. 17, 1971, now abandoned.

BACKGROUND OF THE DISCLOSURE

This invention relates to skid control systems for controlling the braking pressure applied to a wheel and, more particularly, to an improved relay valve for use therein.

The prior art has recognized that in order to brake a vehicle in the shortest possible distance, the braking pressure applied to the wheels should be maintained at a level where there is maximum or optimum braking effort. However, it is also recognized that the optimum brake pressure to stop a vehicle varies with several factors including the particular road conditions. As a result, for any brake system, there is a family of ideal brake pressure curves representative of different road conditions.

Numerous prior art systems have been developed for automatically varying braking pressure in accordance with road conditions to simulate as closely as possible the ideal brake pressure curve for the particular road condition being encountered when the brakes are applied. In general, prior art skid control systems have used various types of sensors to detect either a locked wheel or an impending wheel lock and, in accordance with the signals generated by the sensors, have relieved the brake pressure, allowing the wheel to roll back up to full speed, at which time the brake pressure is reapplied. Ideally, as soon as the impending wheel lock is detected, the brake pressure should be relieved immediately to avoid an actual lock condition. Then, after the brake pressure has been relieved and the wheel speed is increasing, it is desirable to re-apply the braking pressure as quickly as possible, but at a level no higher than that which will maintain wheel slip at an optimum. As a practical matter, these ideal conditions are difficult to achieve and the prior art systems have attempted to simulate ideal brake pressure curve by cyclical application of the brake pressure.

There is disclosed in the aforementioned co-pending applications a relay compensator valve which, in one mode, serves as a pilot-operated relay valve and which, in another mode, functions as a cyclically-operated pressure compensating valve. In the latter mode, the valve is responsive to a signal from an anti-skid sensing system to rapidly relieve the braking pressure. Upon termination of the anti-skid signal, the valve re-applies braking pressure with the pressure rise curve being characterized by a rapid first stage rise rate followed by a substantially slower second stage rise rate. The change from the first stage to the second stage is characterized by a discontinuity or "knee" K in the brake pressure rise curve. The two-stage rise in brake pressure has the advantage that it permits re-establishment of braking force as quickly as possible while minimizing "overshoot" of the ideal brake pressure for the particular road condition.

The attempts to simulate the ideal brake pressure curve by cyclical application of the brake pressure have not been completely successful, partly because of the inability to accurately control the position of the knee K in the brake pressure curve, i.e., the relationship between the brake pressure at which the knee K occurs and the ideal brake pressure. In practice, the knee K has generally occurred at a brake pressure well below the ideal pressure, with the result that a longer period of time is required for the brake pressure to reach the ideal brake pressure, thereby increasing the overall stopping distance as well as the consumption of air by the entire skid control system.

SUMMARY OF THE INVENTION

Accordingly, it is an object of the present invention to provide a skid control system and relay compensator valve for use therein which provides a smoother braking action, a shorter overall stopping distance, and reduced consumption of air by the system.

It is a more specific object of the present invention to provide a relay compensator valve for use in a skid control system in which the brake pressure has a rapid first stage rise rate followed by a substantially slower second stage rise rate wherein the knee K between the first stage and the second stage occurs as near as possible to the ideal brake pressure curve, and is accurately reproducible with respect thereto.

It is an even more specific object of the present invention to provide a relay compensator valve as described, wherein compensator pressure is maintained within a predetermined pressure differential of the brake pressure.

The valve disclosed in the aforementioned patent application employs primary and secondary pistons, and during the rapid first stage rise rate of the brake pressure, the net forces acting on the pistons tending to close the valve establish the knee K in the brake pressure curve. Thus, with all other forces acting on the pistons considered as temporarily remaining constant, the closing of the valve and resultant positioning of the knee K may be considered a function of the compensator pressure, the level of which is established, at least in part, by the level to which the compensator pressure rose on the first brake application. It has been found that because the level to which the brake pressure rises on the first brake application is controlled, maintaining a certain maximum predetermined pressure differential between the brake pressure and the compensator pressure will effectively control the compensator pressure during the rapid first stage rise rate of the brake pressure on the second brake application, thus making it possible to accurately and reproducibly control the knee K in the brake pressure curve.

The above and other objects of the present invention, which will become apparent upon a reading of the following detailed description, are accomplished by the provision of a skid control system including a brake for applying braking forces to the wheel, a fluid pressure operated brake actuator for actuating the brake, skid control sensor means for detecting a skid condition and generating an electrical signal in response thereto, a source of fluid pressure for application to the brake actuator, supply means for supplying a variable control pressure, and a compensating skid control valve for cyclically applying fluid pressure to the brake actuator. The skid control valve comprises a valve housing having a control pressure chamber, an inlet pressure chamber, an outlet pressure chamber, a compensating pressure chamber, and a bias pressure chamber. A valve passage interconnects the inlet and outlet pressure chambers and a first valve means is included for opening and closing the valve passage. The valve means includes first and second piston portions and the first piston portion has a surface operatively exposed to the pressure in the control chamber and another surface operatively exposed to the pressure in the outlet passage chamber. The second piston portion has a surface operatively exposed to the pressure in the compensating chamber and another surface operatively exposed to the pressure in the bias chamber. A first flow passage interconnects the bias chamber with the fluid pressure source and a second flow passage interconnects the outlet pressure chamber and the compensating chamber, with the second flow passage including flow restricting means. A pressure modulator valve means is disposed in the second flow passage and is operable to fluidly bypass the flow restricting means in response to at least a predetermined pressure differential between the outlet pressure chamber and the compensating pressure chamber to permit no more than the predetermined pressure differential between the outlet pressure and the compensating pressure. Thus, on the first brake application, the compensating pressure rises to substantially a predetermined level, so that on the second brake application, the compensating pressure will predictably rise to a second predetermined level, thus delaying the occurrence of the "knee" K until the brake pressure has risen to approximately the ideal brake pressure level.

DESCRIPTION OF THE PREFERRED EMBODIMENT

Figure 1:
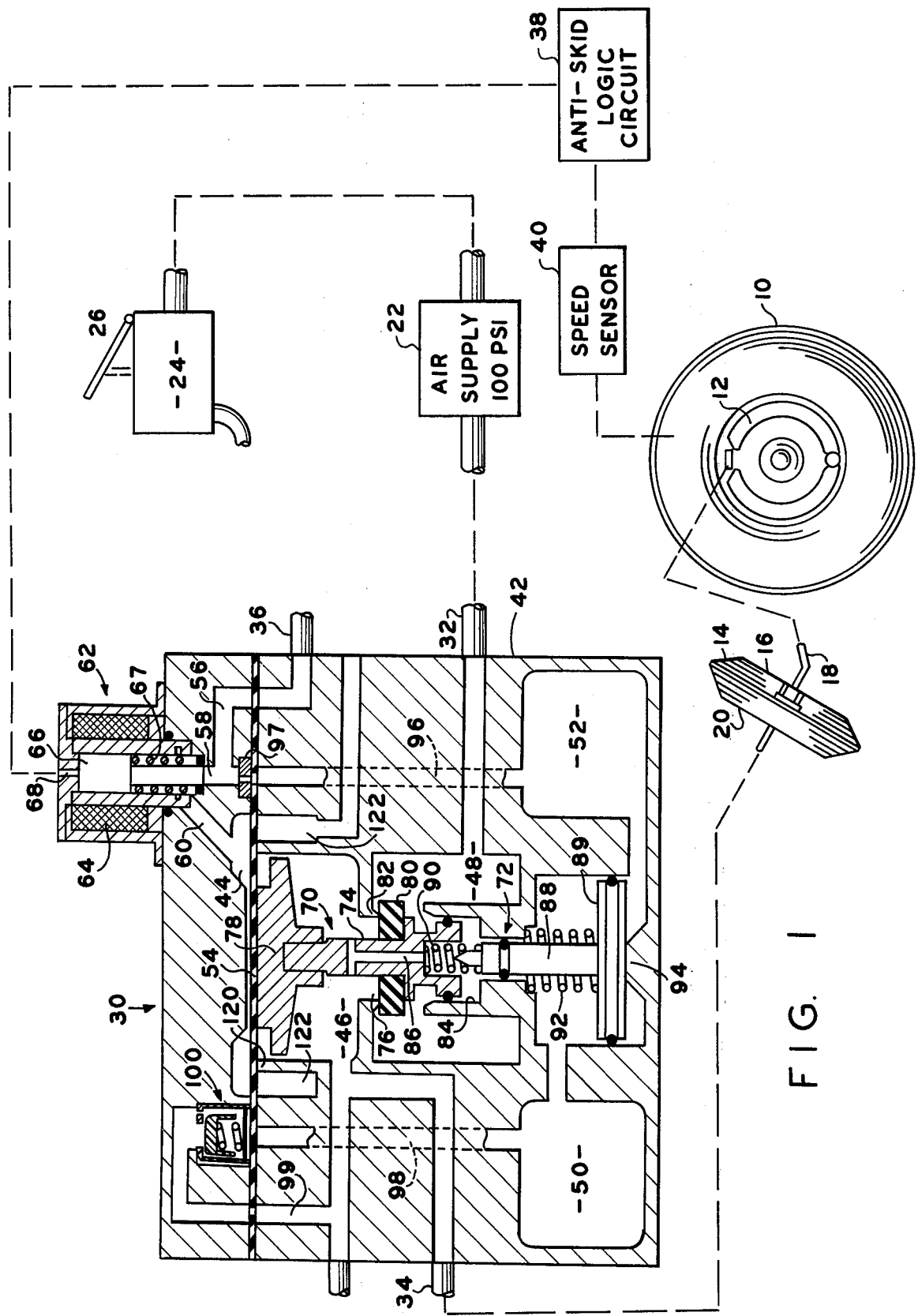
FIG. 1 is a schematic illustration of an anti-skid brake system utilizing the skid control valve of relay compensator valve of the present invention.

Referring now in detail to the drawings, FIG. 1 illustrates schematically one type of brake system in which the valve may be employed. As shown, the system comprises an air brake system which may, for example, be employed on a truck although it will be appreciated that the valve may be employed with other types of vehicles and in other types of brake systems as well. As illustrated, the truck includes a wheel 10 and a conventional wedge type brake 12 which is adapted to be operated by a brake actuator 14. The brake actuator may be of any form but as shown comprises a diaphragm 16, a piston 18 and a fluid pressure chamber 20 into which pressurized fluid is admitted to actuate the brakes 12. The brake system further includes a high pressure air reservoir 22 and a conventional treadle valve 24 connected to the reservoir. The treadle valve 24 is operated by an operator-controlled treadle 26 with the pressure of the air flowing through the valve 24 being proportional to the amount of treadle deflection.

A skid control compensating relay valve constructed in accordance with the principles of this invention is indicated generally by the reference numeral 30. The valve 30 is connected by a conduit 32 to the air reservoir 22 and by conduit 34 to the pressure chamber 20 of the brake actuator 14. It will be appreciated that the same conduit 34 may also be connected to the brake actuator associated with the other wheel on the same axle as the wheel 10. The valve 30 is also connected by conduit 36 to the treadle valve 24.

The brake control system further includes an anti-skid logic circuit 38 and a skid sensor device 40. Since neither the anti-skid circuit nor the sensor, as such, form any part of the invention and since they may for purposes of this disclosure be conventional in construction, the details of these two components have been omitted. In general, the function of the logic circuit is to receive signals from the skid sensor 40, detect either a wheel lock or an impending wheel lock, and generate a signal which, as will be described hereinafter, is utilized to actuate the operation of the valve 30. The logic circuit may operate in various ways but, for example, may be used to detect differential wheel speeds or wheel deceleration, either of which would be indicative of a wheel lock or an impending wheel lock. The skid sensor 40 may be an electromagnetic sensor which generates a signal proportional to the rotational speed of the wheel 10 with that signal being utilized in the logic circuit 38.

The valve 30, the details of which will be described hereinafter, functions as a conventional relay valve during normal braking operation but when a skid condition is encountered functions as an integral part of the skid control system. In the relay mode of operation, that is, in the absence of a skid signal, the valve 30 regulates the air pressure supplied to the brake actuator 14 in proportion to the air pressure supplied by the treadle valve 24. However, if a wheel lock condition is detected, a skid signal will be generated by the anti-skid logic circuit 38, and this signal will be applied to the valve 30. The valve 30 will then be actuated to block the flow of air from the air reservoir 22 to the brake actuator 14 and, simultaneously, vent the chamber 20 of the actuator to atmosphere. When the skid condition which triggered the logic circuit 38 has been relieved, the valve 30 is actuated to re-apply brake pressure at a rapid rate up to a level lower than the pressure level of the previous cycle, followed by a further increase in the brake pressure at a slower rate.

With this general understanding of the operation of the brake system, the details of valve 30 will now be described.

Referring to FIG. 1, the valve is illustrated in its unactuated condition and includes a valve housing 42 in which there are five main chambers, namely, a control pressure chamber 44, a brake pressure chamber or outlet chamber 46, a high pressure or inlet chamber 48, a compensating chamber 50, and a biasing chamber 52. A control diaphragm 54 separates the control chamber 44 from the pressure chamber 46 with the control chamber being connected by passages 56, 58 and 60 to conduit 36.

A three-way solenoid valve 62 controls communication between the control chamber 44 and the conduit 36. The valve 62 includes a coil 64, a core 66 and a spring 67 acting on the core 66 to bias the core to a position where it closes an exhaust port 68. Upon actuation of the solenoid, the core 66 is pulled down against the bias of the spring 67 and blocks off the flow of fluid between passages 58 and 60 while, simultaneously, opening the exhaust passage 68 so that any pressure in the control chamber 44 is exhausted through the exhaust passage.

To control the flow of fluid between the high pressure chamber 48 and the brake pressure chamber 46, there is provided a valve member which comprises a primary piston, indicated generally by the reference numeral 70, and a secondary piston indicated generally by the reference numeral 72. The primary piston 70 comprises a stem portion 74 which extends through a valve opening 76 into both of chambers 46, 48. A piston portion 78 is formed on the upper end of the stem in the chamber 46. An annular seal 80 carried by the stem 74 cooperates with an annular lip 82 around opening 76 defining a valve seat. The other or lower end of the stem 74 is slidably received in a cylindrical recess 84 with the lower end of the stem carrying appropriate seals to prevent high pressure fluid from chamber 48 from acting on the bottom of the stem 74. A pressure equalizing passage 86 extends along the longitudinal axis of the stem 74 opening at one end in the chamber 46 and at its other end in recess 84 which defines an equalizing chamber.

The secondary piston 72 comprises a stem portion 88 and a piston portion 89. The stem 88 is positioned for reciprocation in a bore which is coaxial with the longitudinal axis of stem 74. The axially adjacent ends of the stems 74, 88 are normally separated by a light coil spring 90 with one end of the coil spring resting against the end of the stem 88 while the other end of the coil spring is received in a recess in the end of the stem 74. It will be appreciated that the spring 90 normally biases the secondary piston 72 downward and the primary piston 74 upward.

The piston portion 89 of the secondary piston 72 serves to separate the compensator chamber 50 from the bias chamber 52. Appropriate seals may be provided around the periphery of the piston portion 89 to prevent leakage between the two chambers. The piston portion 89 preferably has substantially the same effective area as the piston portion 78.

A bias spring 92 is positioned around the stem 88 in the compensator chamber 50 and acts against the piston portion 89 to bias it in a downward direction. An abutment stop 94 in the bias chamber 52 acts to limit the movement of the piston under the bias of spring 92.

The bias chamber 52 is connected by passage 96 with the inlet passage 56. A bias orifice 97 is positioned in the passage 96 to meter the fluid flow through that passage.

The compensating pressure chamber 50 is in communication with a passage 98 and the brake pressure chamber is in communication with a passage 99. The passages 98 and 99 are in communication with each other through a pressure modulator valve assembly 100, the details and operation of which will be described more fully in connection with the following description of the various operational modes of the brake system. For a better understanding of the invention, the description should be viewed in conjunction with the curves in FIG. 6.

Relay Mode-Brake Apply

Prior to application of the brake, the parts of the valve 30 are as illustrated in FIG. 1. When the brakes are to be applied, the operator depresses the treadle 26 thereby actuating the treadle valve 24 to allow air to flow from the air reservoir 22 through conduit 36, through passages 56, 58, through normally-open valve 62 and passage 60 into the control chamber 44. The pressure in control chamber 44 rises rapidly and acts on the diaphragm 54 to push the primary piston 70 downwardly, thereby unseating seal 80 from valve seat 82 and allowing high pressure air to flow from the high pressure chamber 48 to the brake pressure chamber 46.

The fluid in chamber 46 passes from conduit 34 to the working chamber 20 of the brake actuator 14 and acts against the diaphragm 16 to displace the piston 18 and actuate the brakes 12. As the brakes are applied, the pressure in the brake chamber 46 rises rapidly and begins to counteract the downward force exerted by the pressure in the control chamber 44 on primary piston 70. As the pressure in the chamber 46 builds up to the level of the control chamber pressure, the net forces acting on the primary piston 70 approach a balanced condition and the spring 90 acts to move the piston back up to a position where seal 80 is seated against the valve seat thereby closing off the flow of air from the high pressure chamber 48 to the brake pressure chamber 46.

Should the operator further depress the treadle 26, additional pressure would be admitted to the control chamber 44 and the primary piston 70 would again move downwardly to unseat the valve and permit additional air pressure to flow into the brake pressure chamber 46 until the pressures across the control diaphragm and piston reach a balanced condition as described above and the valve automatically closes. During this sequence of operation, control air pressure flowing from the treadle valve 24 also passes through the bias orifice 97 and passage 96 into the bias chamber 52.

Simultaneously, the air pressure from the brake pressure chamber 46 is communicated through passage 99, through modulator valve assembly 100, and through passage 98 to the compensator chamber 50. As may be seen in FIG. 2, the modulator valve assembly 100 comprises a housing 102 seated against the upper surface of control diaphragm 54 within an enlarged portion of passage 99. The housing 102, at its upper portion, defines a small compensator bleed orifice 104 and a relatively much larger, compensator dump orifice 106, the orifices 104 and 106 being fluidly "in parallel." The compensator dump orifice 106 is intended, theoretically, to offer no more resistance to the flow of air from passage 99 to passage 98 than do the passages themselves in order to permit the compensator pressure to rise toward the brake pressure. Thus, in one embodiment of the present invention, and merely by way of example, the dump orifice 106 has a diameter of about 0.250 inches (.63 cm) while the bleed orifice 104 has a diameter of about 0.044 inches (.11 cm), resulting in a ratio of the flow area through dump orifice 106 to the flow area through bleed orifice 104 of about 36:1. It has been found that the ratio of the flow areas is preferably at least about 5:1.

Figure 2:
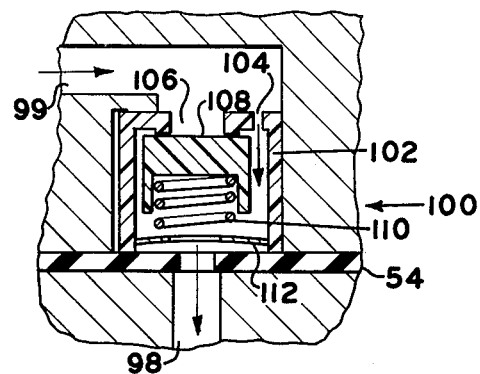
FIGS. 2–5 are enlarged fragmentary cross sections, similar to FIG. 1, of the pressure modulator valve, illustrating the various flow configurations occurring during different operating modes of the skid control valve.

Slidably positioned within the housing 102 is a modulator valve member 108, biased to the normally-closed position shown in FIG. 2 by a biasing spring 110 seated against the upper surface of a retainer member 112 which, preferably, is fitted into a circumferential groove (not shown) formed about the inner surface of the housing 102. In the subject embodiment, the biasing spring 110 exerts a pressure of about 25 psi (172 × $10^6$ Pa). Thus, only when the pressure in the brake pressure chamber 46 becomes at least 25 psi (172 × $10^6$ Pa) greater than the pressure in the compensator chamber 50 will the air be able to force the modulator valve member 108 downward, overcoming the biasing force, and enabling air to flow through the compensator dump orifice 106. At all other times, including the "Brake Apply" portion of the relay mode, the air must pass through the compensator bleed orifice 104 (as shown by the arrow), then through an orifice in the control diaphragm 54 and into passage 98. It will be apparent that the compensator bleed orifice 104 serves as a restriction to the flow of air through passages 98 and 99 but, when the pressure differential is sufficient to unseat modulator valve member 108, the compensator dump orifice 106 permits the air to fluidly bypass bleed orifice 104, i.e., substantially all of the flow is through the dump orifice 106.

Because the pressure in the compensator chamber 50 is substantially the same as the pressure built up in the bias chamber 52, the biasing spring 92 ensures that the secondary piston 72 remains seated against the abutment stop 94.

Relay Mode-Brake Release

When the operator releases the treadle 26, the control pressure in the control chamber 44 discharges back through the normally open solenoid valve 62 and is vented to the atmosphere through the treadle valve 24 in a conventional manner. The venting of the air pressure in the control chamber 44 thereby establishes a pressure imbalance across the diaphragm 54 and the piston portion 78 with the higher pressure being present in the brake pressure chamber 46. The pressure in chamber 46 acts against the underside of the diaphragm to move the diaphragm upward and unseat it from engagement with an annular lip 120. The movement of the diaphragm away from the lip 120 places the brake pressure chamber 46 in communication with an exhaust passage 122 thereby venting the chamber 46 and the brake actuator 14 to the atmosphere.

Figure 3:
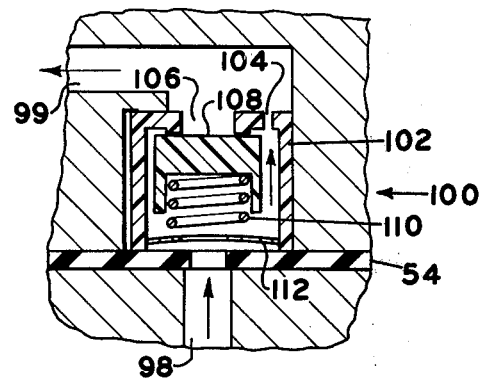

It will be appreciated that as the pressure in the control chamber 44 is vented, the pressure in bias chamber 52 is vented through passage 96 and orifice 97. Similarly, the pressure in the compensator chamber 50 is vented back through passage 98 and through compensator bleed orifice 104 as is shown by the arrows in FIG. 3. It is apparent that the modulator valve member 108 remains tightly seated against the housing 102, closing off the compensator dump orifice 106, whenever the air flows through the valve assembly 100 in the direction shown in FIG. 3.

Compensating Mode

In the compensating or skid control mode, the valve is cyclically operated to apply, release and re-apply the brakes. Each cycle of the valve comprises a first stage brake apply mode, a brake release mode and a second stage brake apply mode.

Figure 6:
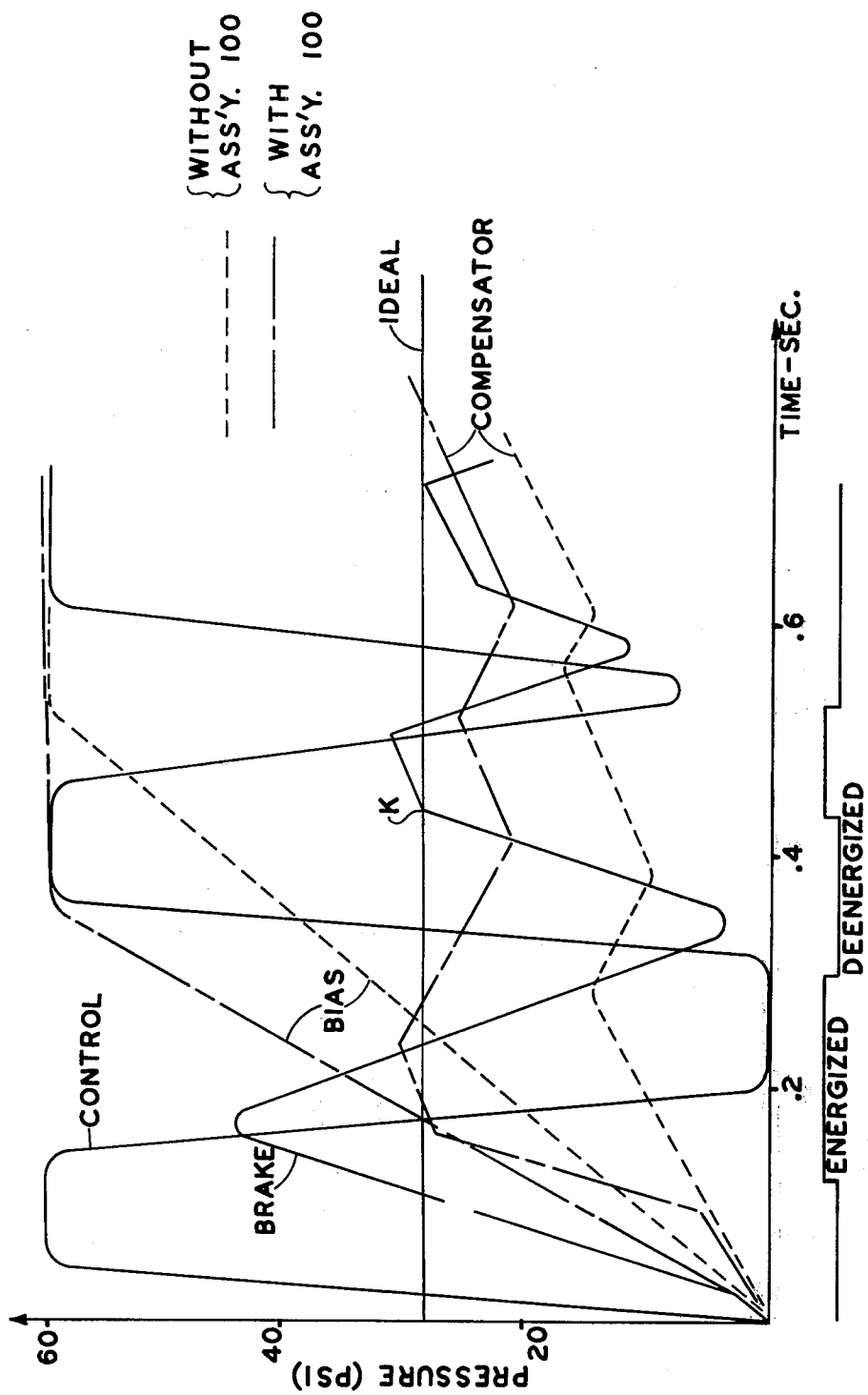
FIG. 6 is a graphic illustration of the pressures in the various chambers of the valve, as a function of time, during operation of the skid control valve.

Before describing the specific manner in which the valve 30 operates in each of these modes, reference may be had to FIG. 6 which illustrates graphically the relationship of the various chamber pressures in valve 30 as a function of time. It should be noted that for compensator chamber pressure and for bias chamber pressure, the broken lines indicate the pressures utilizing the pressure modulator valve assembly 100 of the present invention, whereas the dashed lines indicate the pressures without the modulator valve. Subsequent discussion will relate to the pressures with the valve assembly 100, unless otherwise noted. The brake pressure curve illustrates the pressure in the brake pressure chamber as the valve cycles. As is apparent, the pressure in outlet chamber 46 rises rapidly during initial brake application and, in a skid condition, overshoots the ideal brake pressure by a considerable amount, whereupon the skid logic circuit energizes solenoid valve 62 to release the brake pressure. The pressure in chamber 46 then drops off rapidly until the skid logic circuit de-energizes the solenoid valve 62 and brake pressure is re-applied. During the initial or first stage portion of the re-application cycle, the pressure in chamber 46 rises rapidly until the compensating function of the valve takes effect. This point in the cycle is represented by the discontinuity or knee K in the brake pressure curve. At this point in the cycle the valve enters the second stage in which the pressure in the chamber 46 increases at a much slower rate until an impending skid condition is again detected by the skid logic circuit and the valve is recycled. This two stage or knee K effect in the brake chamber pressure curve increases the effectiveness of the braking by (1) allowing initial re-application pressure to rise rapidly so that effective braking force is re-established as rapidly as possible and (2) decreasing the brake pressure overshoot which, in turn, decreases the number of skid cycles required to bring the vehicle to a smooth and controlled stop as well as to reduce air consumption.

Referring now to the specific operation of the valve 30 in its compensating mode, it will be assumed, for example, that the controlled pressure established by depression of the treadle valve 24 is 60 psi (414 × $10^6$ Pa), while the brake pressure required to lock the wheel 10 is 30 psi (207 × $10^6$ Pa). During initial brake application, the valve 30 introduces pressure to the brake actuator 14. As is shown in FIG. 6, the pressure in the control chamber 44 quickly rises to 60 psi (414 × $10^6$ Pa) and the pressure in the brake pressure chamber 46 also rises rapidly to substantially above the ideal brake pressure 30 psi (207 × $10^6$ Pa), thereby creating an impending wheel lock condition which is sensed by the logic circuit 38, which then energizes the solenoid valve 62. Upon actuation of the solenoid valve 62, the valve 30 operates as follows:

The core 66 moves downward to close off the inlet passage 58 to the control chamber 44, thereby allowing the pressure in the control chamber 44 to exhaust through the exhaust port 68 to atmosphere and allowing seal 80 to seat on valve seat 82 as previously described. Brake chamber 46 is thereby isolated from the air supply 22; however, because the treadle valve 24 remains depressed, bias chamber 52 remains in communication with the air supply 22 through the bias orifice 97. Therefore, the pressure in the bias chamber 52 continues to rise while brakes are being released. The pressure in compensator chamber 50 also continues to rise for a brief period until evacuation of the brake pressure chamber 46 has reduced the pressure in that chamber to a level below the level in the compensating pressure chamber, at which point the compensating pressure begins to decrease. The resulting pressure imbalance across piston portion 89 causes the secondary piston 72 to move upward against the bias force of springs 90 and 92 into contact with the lower end of primary pistons 70.

After the evacuation of the pressure in the brake pressure chamber 46, the wheel 10 will run back up to speed and the logic circuit 38 will act to de-energize solenoid valve 62, thereby placing the control pressure chamber 44 in communication with the air supplied by the treadle valve 24. Once again, the pressure in the control chamber 44 rises very rapidly back to the pressure level established by the treadle valve 24. At this point, the valve is in its first stage re-apply mode wherein the pressure acting downward on the primary pistons 70 unseats the valve or seal 80 and permits pressure to flow from the high pressure or inlet pressure chamber 48 to the brake pressure chamber 46. The brake pressure rises rapidly until the pressures in the various chambers, together with the bias spring 92, cooperate to reseat the valve seal 80, thereby establishing the discontinuity or knee K.

Figure 4:
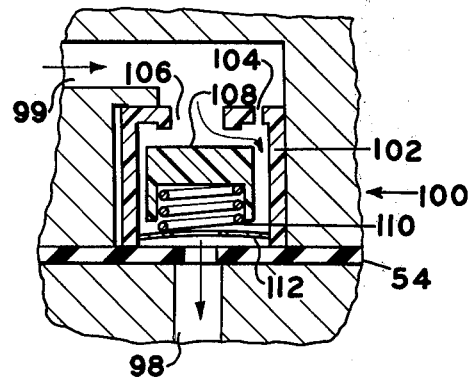

It is during this first brake application just described that the pressure modulator valve assembly 100 performs its primary function. Referring again to FIG. 6, it will be noted that during the initial buildup of pressure in the brake pressure chamber 46, the rate of pressure rise is greater in the brake pressure chamber 46 than in the compensator chamber 50 until a sufficient pressure differential exists between the chambers to overcome the biasing force of biasing spring 110. When this occurs, as is shown in FIG. 4, the air in passage 99 forces the modulator valve member 108 downward, permitting air to flow through the compensator dump orifice 106, rather than requiring the air to pass through the compensator bleed orifice 104 at a rate which is insufficient for the pressure in the compensator chamber 50 to rise as rapidly as that in the brake pressure chamber 46.

Thus, it will be seen by referring again to FIG. 6, that at the end of the first brake application, the compensator pressure is substantially higher than the brake pressure and the dumping of air whenever there is an excessive (greater than 25 psi (172 × 10⁶ Pa) in the subject embodiment) pressure differential between passages 98 and 99 results in the compensator pressure being substantially higher with the pressure modulator valve assembly 100 included than without it. In addition, the use of the modulator valve assembly 100 makes it possible to maintain a predetermined relationship between the compensator pressure and the brake pressure.

The manner in which the valve operates to establish the knee K is best described by an analysis of the forces acting on the primary and secondary pistons. At the time when the solenoid valve 62 is de-energized and the first stage pressure rise commences, the pressures in the respective chambers, from FIG. 6, are approximately as follows:

Control 60 psi (414 × 10⁶ Pa)
Bias 60 psi (414 × 10⁶ Pa)
Compensator 25 psi (172 × 10⁶ Pa)
Brake 4 psi (28 × 10⁶ Pa)

In addition to these forces, the spring 92 acts on the secondary piston 72. The spring rate of spring 92 is selected such that it exerts a biasing force which is equivalent to a predetermined fluid pressure acting in the compensator chamber 50. For purposes of this disclosure, the spring 92 may be considered the equivalent of 8 psi (55 × 10⁶ Pa) acting in chamber 50.

The net pressure difference across the diaphragm 54 multiplied by the effective area (Ae) of piston portion 88 gives the resulting downward force on the primary piston 70. Since the secondary piston 72 is in contact with the primary piston, the forces acting on that piston must also be considered. The pressure difference across the secondary piston 89 multiplied by its effective area (which is equal to the effective area of the primary piston) gives the resulting force acting on the secondary piston.

Thus the net forces acting on the valve member are as follows, considering valve opening forces positive and valve closing forces negative:

$F_{net} = F_{primary} + F_{secondary} = (60-4)\, Ae + (25+8-60)\, Ae = (56-27)\, Ae$ From the foregoing analysis, it is apparent that the valve moves downward to admit pressure to the brakes, thereby providing the desired initial rapid rise in pressure.

As pressure is admitted to the chamber 46, the pressure in that chamber increases and begins to act upwardly on primary piston 70 in opposition to the downward forces exerted by the pressure in the control chamber 44. At the same time, the pressure in the compensator chamber 50 is increasing. Ultimately, pressure levels are reached which results in a net upward force acting on the primary piston to move it to a closed position, thereby producing the discontinuity or knee K. As shown in FIG. 6, this discontinuity occurs at approximately 0.43 seconds into the stop, at which time the chamber pressures are as follows:

Control 60 psi (414 × 10⁶ Pa)
Bias 60 psi (414 × 10⁶ Pa)
Brake 30 psi (207 × 10⁶ Pa)
Compensator 23 psi (159 × 10⁶ Pa)
Spring 8 psi (55 × 10⁶ Pa)

The net forces acting on the valve are now as follows:
$F_{net} = (60-30)\, Ae + (23+8-60)\, Ae = (30-29)\, Ae$ Thus, the net forces act in an upward direction causing the valve to close, or nearly close.

Figure 5:
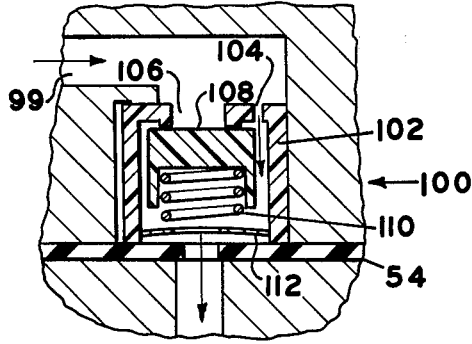

The second stage of the brake pressure rise curve is determined by the flow through the compensator bleed orifice 104 and the pressure drop across it because, as is illustrated in FIG. 5, the pressure in the brake pressure 46 exceeds that in the compensator chamber 50 by less than that which is needed to unseat the modulator valve member 108. Therefore, at the time the valve seal 80 closed, as represented by the knee K, the modulator valve member 108 is biased to its closed position, sealing off the compensator dump orifice 106. As a result, pressure in the brake pressure chamber 46 continues to bleed through the compensator bleed orifice 104 into the compensator chamber 50. The bleeding of brake pressure into the compensator chamber 50 increases the pressure in the compensator chamber and thereby reduces the pressure differential across the secondary piston 89. This reduction in pressure differential causes a decrease in the net forces acting upward on the piston 89, thereby allowing a slight downward movement of the piston, and an unseating of the valve seal 80 to permit pressure to bleed from the high pressure chamber 48 into the brake pressure chamber 46. The rate at which the air flows between the two chambers is a function of the pressure rise rate in the compensator chamber 50. This results in a relatively slow second stage rise in pressure in the brake chamber and avoids any substantial overshooting with respect to the ideal brake pressure. The second stage rise rate can be varied by varying the size of the compensator bleed orifice 104.

The pressure in the chamber 46 rises at a slow rate until it exceeds the ideal brake pressure, at which time the skid logic will again signal an impending wheel lock and the valve will be recycled.

With the next cycle of the valve, the solenoid valve 62 is energized a significantly shorter period of time than in the first cycle since overshooting was substantially avoided thereby eliminating the need for evacuation of excess brake pressure. As a result, the chamber 46 is communicated to atmosphere a shorter period of time and the brake pressure level does not decrease as much as in the previous cycle. Correspondingly, the pressure in the compensator chamber is maintained at a slightly higher level than in the previous cycle. Of course, once the cycling of the valve 30 ceases, the pressure in the compensator chamber will approach the same value as the pressure in the brake chamber and the compensation effect will disappear.

The location of the knee K in each cycle is dependent on the brake pressure time history of the previous cycle which, in turn, is dependent on various factors including the vehicle operator applied pressure, wheel lock-up pressure, road to tire coefficient of friction, wheel assembly inertia, brake characteristics and numerous other factors which affect vehicle braking performance.

Once the bias chamber pressure has reached a steady state condition, that is, equal to the control pressure, the spring 92 is effective to establish the knee K at a pressure which is a predetermined level above the compensator pressure. Thus, using the example heretofore given of a spring having a spring rate equivalent to 8 psi ($55 \times 10^6$ Pa), the knee K in the brake pressure rise curve will always occur at a pressure that is 8 psi ($55 \times 10^6$ Pa) above the compensator pressure. Since, in any brake system a certain minimum pressure, for example 5 psi ($34 \times 10^6$ Pa), is required to overcome inertia, hysteresis effects and friction inherent in the brake structure, the bias spring 92 assures that the brake pressure will exceed the compensator pressure by an amount in excess of the minimum required pressure for actuation of the brakes, before the knee K is established and the slow second stage pressure rise is obtained. By comparing the bias pressure curves with and without the modulator valve assembly 100, it can be seen that the use of assembly 100 has made it possible in the subject embodiment to enlarge the area of bias orifice 97, with the result that the bias pressure reaches the level of the control pressure much faster. It was not feasible to do so prior to the present invention because without the modulator valve assembly, too fast a rise in the bias pressure could cause a knee K in the brake pressure curve during the first brake application. Such a knee K would have no reference or basis and would be uncontrolled and of no use. However, with the present invention it is possible to let the bias pressure rise so that it is at a stable level (same as control pressure) by the time the knee K occurs so that the knee K is no longer a function of a changing bias pressure.

The operation of spring 92 in the valve has the advantage that in a very mild skid condition in which only slight excess brake pressure is applied, the valve will be cycled to correct the skid but the knee K, with its attendant slow second stage, will not necessarily be produced. On the other hand, where substantially excess brake pressure is applied creating a more serious skid condition, the two stage pressure rise having the knee K will be obtained as described.

While the invention has been described with reference to a preferred embodiment, neither the illustrated embodiment nor the terminology employed in describing it is intended to be limiting; rather, it is intended to be limited only by the scope of the appended claims.

We claim:

1. In a skid control system for use in controlling the braking pressure applied to a wheel, said system including a brake for applying braking forces to the wheel, a fluid pressure operated brake actuator for actuating said brake, skid control sensor means for detecting a skid condition at the wheel and generating an electrical signal in response thereto, a source of fluid pressure for application to said brake actuator, means for supplying a variable control pressure, and a compensating skid control valve in said system for cyclically applying fluid pressure to said brake actuator in response to the electrical signal generated by said skid control sensor means, said skid control valve comprising:
   a. a valve housing having a control pressure chamber, an inlet pressure chamber, an outlet pressure chamber, a compensating pressure chamber and a bias pressure chamber;
   b. a valve passage interconnecting said inlet and outlet pressure chambers;
   c. a first valve means for opening and closing said valve passage, said valve means including a first piston portion and a second piston portion;
   d. said first piston portion having a surface operatively exposed to the pressure in said control chamber and another surface operatively exposed to the pressure in said outlet pressure chamber;
   e. said second piston portion having a surface operatively exposed to the pressure in said compensating chamber and another surface operatively exposed to the pressure in said bias chamber;
   f. first flow passage means interconnecting said bias chamber with said fluid pressure source and second flow passage means interconnecting said outlet pressure chamber and said compensating chamber, said second flow passage means including flow restricting means;
   g. pressure modulator valve means disposed in said second flow passage, said modulator valve means being operable to fluidly bypass said flow restricting means in response to at least a predetermined pressure differential between said outlet pressure chamber and said compensating chamber to permit no more than said predetermined pressure differential between said outlet pressure and said compensating pressure;
   h. the fluid pressure in said control chamber and said compensating chamber cooperating with said first valve means to urge said valve means open, the pressure in said outlet chamber and said bias chamber acting on said valve means to urge said valve means closed; and
   j. biasing means operatively associated with said second piston portion to supplement the forces exerted on said second piston portion by the fluid pressure in said compensating chamber.

2. A skid control system as defined in claim 1 wherein said pressure modulator valve means includes a valve housing defining a modulator valve passage, and wherein said flow restricting means comprises said valve housing defining a flow restricting orifice fluidly in parallel with said modulator valve passage.

3. A skid control system as defined in claim 1 wherein the flow rate through said modulator valve means is substantially greater than through said flow restricting means.

4. A skid control system as defined in claim 1 wherein said modulator valve means is operable to permit flow of fluid only in a direction from said outlet pressure chamber toward said compensating pressure chamber.

5. In a skid control system for use in controlling the braking pressure applied to a wheel, said system including a brake for applying braking forces to the wheel, a fluid pressure operated brake actuator for actuating said brake, skid control sensor means for detecting a skid condition at the wheel and generating an electrical signal in response thereto, a source of pressurized fluid for application to said brake actuator, means for supplying a variable control pressure and a compensating skid control valve in said system for cyclically applying fluid pressure to said brake actuator in response to the electrical signal generated by said skid control sensor means, said skid control valve comprising:

a. a valve housing defining an inlet pressure chamber, an outlet pressure chamber and a compensating pressure chamber;
  b. a valve passage communicating between said inlet and outlet pressure chambers;
  c. control valve means disposed in said valve passage, said control valve means including a piston portion having a surface thereof operatively exposed to the pressure in said compensating pressure chamber; the opening of said control valve means being at least partially a function of the pressure in said compensating pressure chamber;
  d. means defining a flow passage communicating between said outlet pressure chamber and said compensating pressure chamber, said flow passage defining means including flow restricting means; and
  e. pressure modulator valve means disposed in said flow passage, said pressure modulator valve means being operable to fluidly bypass said flow restricting means, in a direction from said outlet pressure chamber towards said compensating pressure chamber, in response to at least a predetermined pressure differential between said outlet pressure chamber and said compensating pressure chamber to maintain said compensating pressure no more than said predetermined pressure differential below said outlet pressure during a first brake application to provide, during a second brake application, a compensating pressure which is a predictable function of the peak outlet pressure during said first brake application.

6. A skid control system as defined in claim 5 wherein said pressure modulator valve means includes a valve housing defining a modulator valve passage, and wherein said flow restricting means comprises said valve housing defining a flow restricting orifice fluidly in parallel with said modulator valve passage.

7. A skid control system as defined in claim 6 wherein the flow rate through said modulator valve passage is substantially greater than through said flow restricting orifice.

8. A skid control system as defined in claim 6 wherein said pressure modulator valve means includes:

a. a modulator valve member movably disposed in said valve housing; and
  b. means biasing said modulator valve member toward a normally-closed position preventing a flow of fluid through said modulator valve passage, said biasing means exerting a biasing force approximately equivalent to said predetermined pressure differential when said modulator valve member is in said normally-closed position.

9. A skid control system as defined in claim 5 wherein said modulator valve means is operable to permit flow of fluid only in a direction from said outlet pressure chamber toward said compensating pressure chamber.

* * * * *

UNITED STATES PATENT OFFICE
CERTIFICATE OF CORRECTION

PATENT NO. : 3,929,383
DATED : December 30, 1975
INVENTOR(S) : John A. Urban et al It is certified that error appears in the above-identified patent and that said Letters Patent are hereby corrected as shown below:

In the title:   "A" is omitted at the beginning of the Title.

Col. 3, line 39:   "of" should read -- or --.

Signed and Sealed this eighth Day of June 1976

[SEAL]

Attest:

RUTH C. MASON
Attesting Officer

C. MARSHALL DANN
Commissioner of Patents and Trademarks